(12) United States Patent
Booher

(10) Patent No.: US 7,374,379 B2
(45) Date of Patent: May 20, 2008

(54) WINCH FOR CARGO-RETAINING STRAP

(75) Inventor: Howard D. Booher, Atwater, OH (US)

(73) Assignee: East Manufacturing Corporation, Randolph, OH (US)

( * ) Notice: Subject to any disclaimer, the term of this patent is extended or adjusted under 35 U.S.C. 154(b) by 0 days.

(21) Appl. No.: 11/248,954

(22) Filed: Oct. 11, 2005

(65) Prior Publication Data

US 2006/0088395 A1  Apr. 27, 2006

Related U.S. Application Data

(60) Provisional application No. 60/664,023, filed on Mar. 22, 2005, provisional application No. 60/617,867, filed on Oct. 12, 2004.

(51) Int. Cl.
*B60P 7/08* (2006.01)
(52) U.S. Cl. .................. 410/103; 410/100; 410/104
(58) Field of Classification Search .............. 410/12, 410/103, 100, 104, 106; 254/217–218, 223, 254/369, 376; 24/68 CD
See application file for complete search history.

(56) References Cited

U.S. PATENT DOCUMENTS

| | | | |
|---|---|---|---|
| 2,895,714 A | 7/1959 | Clark | |
| 2,991,975 A | 7/1961 | Alexander | |
| 3,053,508 A * | 9/1962 | Schultz | ............ 410/7 |
| 3,697,045 A | 10/1972 | Farley | |
| 4,045,002 A | 8/1977 | Miller | |
| 4,367,993 A | 1/1983 | Meigs | |
| 4,382,736 A | 5/1983 | Thomas | |
| 4,992,015 A | 2/1991 | Florence | |
| 5,156,506 A | 10/1992 | Bailey | |
| 5,186,586 A | 2/1993 | Stephenson, Jr. | |
| 5,261,619 A | 11/1993 | Merriweather, Jr. | |
| 5,433,565 A | 7/1995 | Chan | |
| 5,490,749 A | 2/1996 | Arbues | |

(Continued)

FOREIGN PATENT DOCUMENTS

FR    2 462 619    2/1979

OTHER PUBLICATIONS

"Corrosion Explosion", Trailer/Body Builders, Sep. 2004, pp. 38-45.

*Primary Examiner*—Stephen Gordon
(74) *Attorney, Agent, or Firm*—Fay Sharpe LLP

(57) ABSTRACT

A winch for a cargo restraining strap includes a frame having a base and first and second parallel spaced sidewalls. The first and second sidewalls define respective first and second apertures. A protective wall extends from the base and is spaced from the first sidewall. The first sidewall and the protective wall cooperate to define a clevis structure including a channel. A pawl is movably secured to the frame, with an inner end thereof located in the clevis channel. A spool extends between the first and second sidewalls and is rotatably supported in the first and second apertures of the first and second sidewalls. A ratchet wheel is connected to the spool and is located adjacent the first sidewall. The ratchet wheel is selectively engaged by the pawl. The frame, spool and ratchet wheel can be defined from aluminum alloy. The frame can be extruded as a one-piece construction. The spool and ratchet wheel can be extruded as a one-piece construction.

9 Claims, 10 Drawing Sheets

U.S. PATENT DOCUMENTS

| | | |
|---|---|---|
| 5,664,918 A | 9/1997 | Heider et al. |
| 5,791,844 A | 8/1998 | Anderson |
| 5,853,164 A | 12/1998 | Hunt |
| 5,860,777 A | 1/1999 | Walsh et al. |
| 6,350,088 B1 | 2/2002 | Priester |
| 2002/0025237 A1 | 2/2002 | Adams |

* cited by examiner

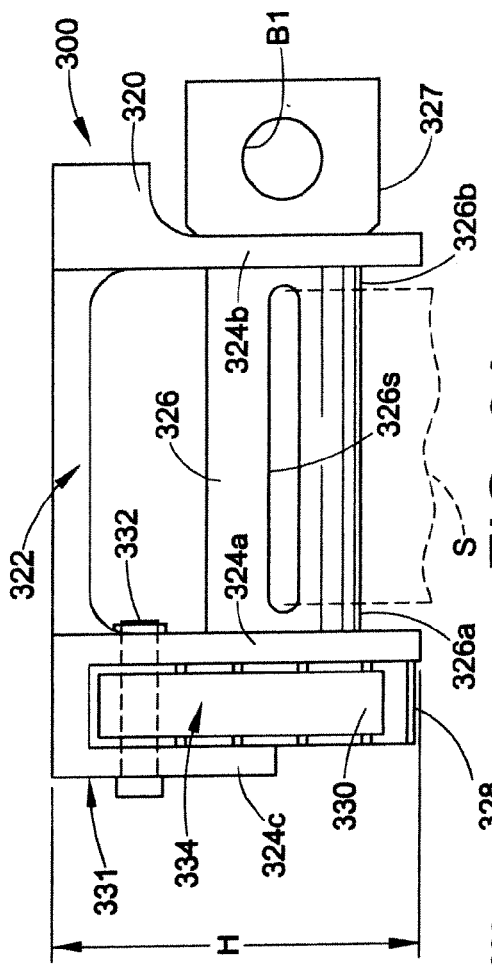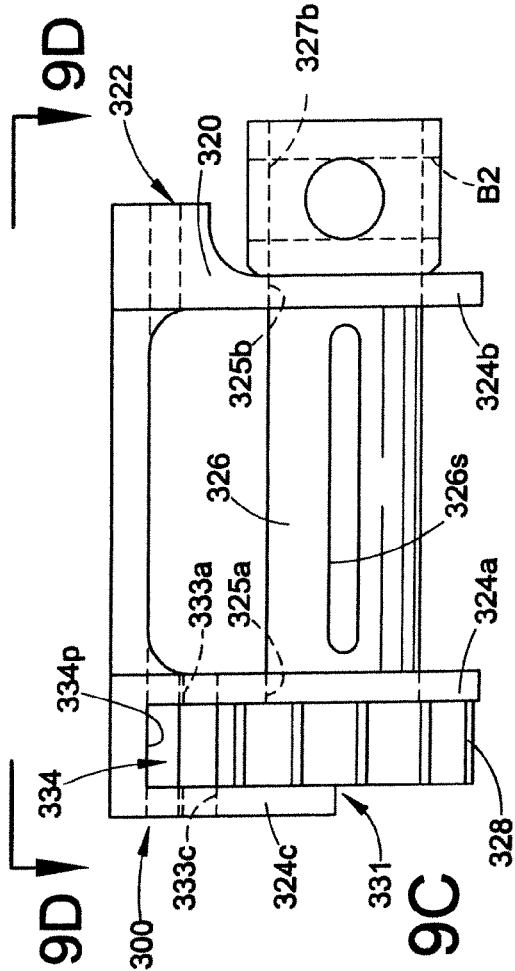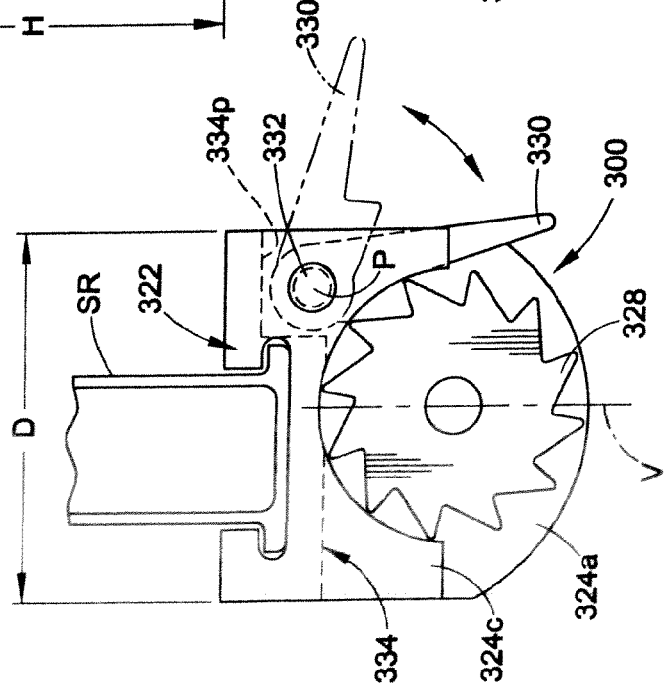

WINCH FOR CARGO-RETAINING STRAP

CROSS-REFERENCE TO RELATED APPLICATIONS

This application claims priority from and benefit of the filing date of both: (i) U.S. provisional application Ser. No. 60/617,867 filed Oct. 12, 2004; and, U.S. provisional application Ser. No. 60/664,023 filed Mar. 22, 2005, and both of these provisional applications are hereby incorporated by reference into the present specification.

BACKGROUND

FIG. 1 illustrates a known winch 10 for retaining/tightening a cargo-retaining strap. The winch 10 comprises a steel frame 20 including a base 22 having first and second separate base plates 22a,22b that define locations L1,L2 for sliding receipt of a double-L track that is connected to or formed as a part of a cargo trailer or cargo bed, e.g., as part of a "flat-bed" trailer. First and second parallel legs 24a,24b are welded to the base 22 and cooperate with the base to define the frame 20 with an inverted U-shaped structure. A spool 26 is rotatably supported by and between the legs 24a,24b and comprises a slot 26a in which a cargo-retaining strap S is inserted and then wound around the spool for storage/use. The strap S is payed-out from the spool 26 as needed by counter-clockwise rotation of the spool, and retracted as needed by clockwise rotation of the spool 26. The spool 26 includes a driving head (not shown) that projects outwardly from sidewall 24b and that is engaged by a winch bar or other tool to rotate the spool. A ratchet wheel 28 is welded to the spool 26 and rotates therewith adjacent an outer face of sidewall 24a. A pawl 30 is pivotally secured to the sidewall 24a by a bolt, pin or other fastener 32 and pivots between a first position, as shown, where it engages the ratchet wheel 28 and prevents counter-clockwise rotation of the ratchet wheel 28 and spool 26 but allows clockwise rotation for strap tightening operations, and a second position, where it is disengaged from the ratchet wheel 28 to allow free rotation of the ratchet wheel 28 and spool 26 in either direction. The pawl 30 is normally positioned in its first position, as shown, by force of gravity and/or a biasing spring. The base 22 of the winch 10 can also be configured to mate slidably with a flanged side-rail of a cargo trailer or cargo bed, e.g., of a "flat-bed" trailer.

The winch 10 shown in FIG. 1 has been found to be sub-optimal for a variety of reasons. The frame 20, spool 26, ratchet wheel 28 and pawl 30 are defined from ferrous steel and are susceptible to corrosion and can weigh as much as 9 pounds (lbs.) or more. Furthermore, the frame 20, itself, comprises four separate steel pieces (base plates 22a,22b, sidewalls 24a,24b) that must be arranged properly and then welded together which increases assembly time and cost. Furthermore, the weld zones are susceptible to corrosion and/or failure.

FIG. 2 illustrates another known cargo-strap retaining winch 10' that is structured similarly and functions identically to the winch 10. Unlike the winch 10, however, the winch 10' comprises a one-piece frame 20' defined from a steel plate that is bent into the required inverted U-shaped structure so as to comprise a base 22' and first and second sidewalls 24a',24b'. The locations L1',L2' for slidably mating with a double-L track of a flat-bed trailer or other cargo hauling structure as described above can be machined after the U-shaped frame 20' is defined or can be defined in the frame-stock prior to the bending operation. The winch 10' comprises a spool 26', ratchet wheel 28' and pawl 30' that are identical in structure and function to those described above in connection with FIG. 1. The base 22' of the winch 10' can also be configured to mate slidably with a flanged side-rail of a cargo trailer or cargo bed, e.g., of a "flat-bed" trailer.

The winch 10' represents an advantage over the winch 10 in terms of the simplified one-piece structure of the steel frame 20' which eliminates all welding operations required to construct the frame 20 of the winch 10. Like the winch 10, however, the frame 20', spool 26', ratchet wheel 28' and pawl 30' of the winch 10' are defined from ferrous steel and, as such, are susceptible to corrosion in a manner similar to the winch 10 and are high-weight, especially in light of the fact that a single trailer or other cargo bed will typically carry multiple winches, e.g., ten or more.

Another main disadvantage of the winch 10', resulting from its one-piece U-shaped frame 20', is that the base 22' of the frame has a maximum possible width W1 which is only equal to the width W2 defined inclusively between the parallel sidewalls 24a',24b'. This maximum possible width or "footprint" of the base 22' has been found to be deficient for certain applications because the forces exerted on the winch 10' by the strap S are undesirably concentrated within the maximum width W1 of the base. More particularly, the steel-framed winch 10' is often mated with an aluminum structure such as a double-L track, a flanged side-rail, or the like of a cargo trailer, and this mismatch in material hardness and elasticity has been found to result in damage to the aluminum structure such as, e.g., bending, gouges, and tearing. The steel winch frame 20' has a much higher hardness and lower elasticity as compared to the aluminum mounting structure of a flat-bed trailer or the like, and this leads to the noted damage to the aluminum structure. For example, 6061-T6 aluminum alloy has a Brinell hardness number (BHN) of 95, while Brinell hardness numbers for common steels, such as those used to manufacture the conventional winches 10,10', vary between BHN=133 for A569 steel to BHN=250 for A514 and 100XF steels, and BHN=400 for AR400 steel. Furthermore, aluminum alloys commonly used in trailer and other cargo bed manufacturing such as, e.g., 6061-T6 extrusions, have a modulus of elasticity that only ⅓ of the modulus of elasticity of steel, i.e., the deflection of an aluminum structure will be three-times that of a similar steel structure. As such, it can be seen that use of steel winch structures 10,10' on an aluminum trailer or cargo bed leads to an inherent mismatch in hardness and elasticity, with the common result being that the steel winch permanently damages the aluminum structure. Given the increasing popularity of flat-bed trailers and cargo beds defined entirely from aluminum or having aluminum siderails and/or winch tracks for mating with winches, a need has been identified for a new and improved winch compatible with these aluminum structures.

A further problem associated with use of steel winches 10,10' on an aluminum alloy trailer or cargo bed is the resulting galvanic or "electrolysis" reaction that occurs between these dissimilar materials in the presence of an electrolyte, e.g., when wet by humidity or rain water. This reaction often causes the winches to become stuck on the winch track in a manner that prevents them from being easily moved to the required location to adjust the position of the cargo straps. Also, the electrolysis reaction speeds corrosion at the interface of the dissimilar metals due to ion exchange and can lead to severe pitting and failure.

New ice and snow control techniques have exacerbated the corrosion of conventional steel winches and also appear to act as a catalyst to the damaging electrolysis reaction between steel winches and aluminum alloy trailers and cargo beds. These new ice and snow control techniques include use of liquid compounds comprising magnesium chloride or calcium chloride that are many times more corrosive to steel as compared to "road salt" as we know it, e.g., sodium chloride. These new techniques are becoming more popular due to a cost advantage and are causing extensive damage to steel components of truck trailers. This phenomenon is documented in the article "Corrosion Explosion" appearing in the September 2004 issue of Trailer/Body Builders, pps. 38-45. As such, it is clear that corrosion of conventional steel winches 10,10' exposed to these increasingly popular ice/snow control compounds will accelerate and render same unusable and/or unsafe.

Another main disadvantage associated with known winches 10,10' is that the connection between the pawl 30,30' and the sidewall 24a,24a' frame by a bolt or other fastener 32 connected to the frame 20,20' can be insufficient to hold the high-loads imposed on pawl 30,30' through the ratchet wheel 28,28'. In particular, the fastener 32 is subjected to high bending and shearing forces that have been found to cause failure of the fastener with the result being an unconstrained ratchet wheel 28,28' and strap S which can lead to loss of the cargo load. As such, improvements have been deemed desirable in connection with the connection of the pawl 30,20' to the frame 20,20' to improve safety.

With reference to FIGS. 2A,2B,2C, the steel frames 20,20' of the winches 10,10' lead to another safety deficiency in that the winches 10,10' are often slidably receivable onto extruded aluminum winch tracks T1,T2,T3 such as double-L tracks defined from aluminum extrusions with a loose or uneven fit that results in gaps G1,G1,G3 between the track and the base 22,22' of the winch frame. These gaps have been found to be highly undesirable in that forces exerted on the winch are not evenly distributed to the track and are thus more likely to damage the track, especially in light of the material mismatch issues noted above. In order for the winches 10,10' to fit a double-L track with a more intimate fit, plates and other structures would have to be welded to the frames where needed, or added-thickness plates would need to be used to weld the frame or in the bended frame, and/or other time-consuming processing would be required, and this has not been done owing to economic constraints and/or because others have not recognized this problem of using steel winches on aluminum winch tracks.

SUMMARY

In accordance with a first aspect of the present development, a winch for a cargo restraining strap includes: a frame including: (i) a base; (ii) first and second parallel spaced sidewalls extending from the base, the first and second sidewalls defining respective first and second apertures; (iii) a protective wall extending from the base and spaced from the first sidewall, wherein the first sidewall and said protective wall cooperate to define a clevis structure including a channel defined between the first sidewall and the protective wall; a pawl movably secured to the frame, wherein an inner end of the pawl is located in the channel of said clevis structure; a spool extending between the first and second sidewalls and rotatably supported in the first and second apertures; and, a ratchet wheel connected to the aid spool and located adjacent the first sidewall, wherein the ratchet wheel is selectively engaged by the pawl.

In accordance with another aspect of the present development, a trailer includes a winch-receiving structure and a winch slidably connected to said winch-receiving structure. The winch comprises: a winch frame defined as a one-piece aluminum alloy member, the winch frame comprising a base adapted to be slidably received on the winch-receiving structure and comprising first and second sidewalls that project from the base. A pawl is pivotally secured to the frame. A spool for holding an associated cargo strap is provided and includes a first end and a second end. A portion of the first end of the spool extends through the first sidewall and a portion of the second end of the spool extends through the second sidewall. The spool is rotatably supported by the first and second sidewalls. A ratchet wheel connected to the first end of the spool and located adjacent the first sidewall. The ratchet wheel is positioned for selective engagement by the pawl, wherein the ratchet wheel and spool, when engaged by the pawl, are rotatable in one direction only.

In accordance with another aspect of the present development, a method of manufacturing a winch for a cargo retaining strap comprising the steps of: extruding a one-piece aluminum alloy workpiece having a base, parallel first and second spaced apart sidewalls connected to the base, a protective outer wall arranged parallel to and spaced apart from the first sidewall, wherein said first sidewall and said protective outer wall define a channel therebetween. The method further includes machining the workpiece to define a slot in the base for slidably receiving a winch mounting structure of an associated trailer. The method further includes machining the workpiece to define aligned apertures in the first and second sidewalls and inserting a spool for retaining an associated cargo strap into the aligned apertures of the first and second sidewalls, wherein the spool comprises a ratchet wheel connected thereto. The method further includes pivotally securing at least part of a pawl in the channel, wherein the aid pawl is selectively engaged with the ratchet wheel to allow rotation of the ratchet wheel and the spool in a first direction in a ratchet-like fashion and to prevent rotation of the ratchet wheel and spool in a second direction.

BRIEF DESCRIPTION OF THE DRAWINGS

A winch for cargo-retaining strap formed in accordance with the present development comprises various components and arrangements of components, and is constructed according to various steps, preferred embodiments of which are disclosed herein with reference to the drawings, wherein.

DETAILED DESCRIPTION

Figure 1:
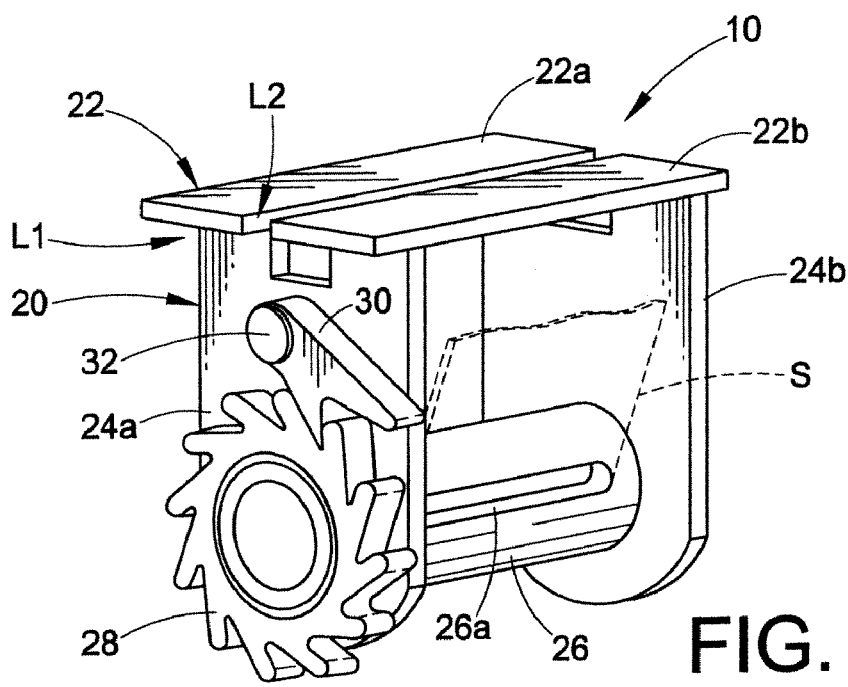
FIG. 1 (prior art) shows a known winch with a welded, multi-component steel frame.
Figure 2:
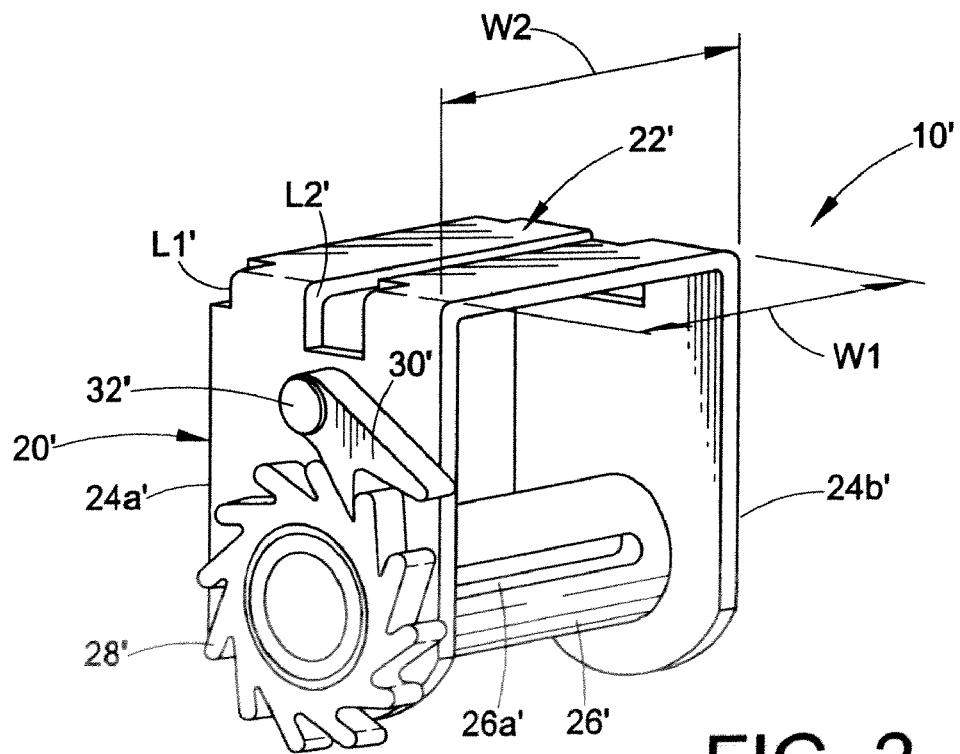
FIG. 2 (prior art) shows a known winch with a one-piece steel frame.
Figure 2A:
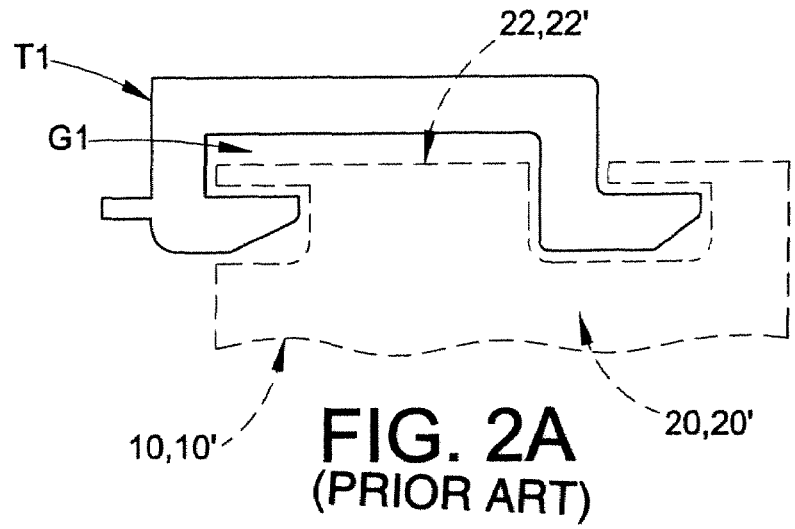
FIGS. 2A,2B,2C (prior art) respectively show examples of different profiles of conventional extruded aluminum alloy winch tracks T1,T2,T3 on which the steel winches of FIGS. 1 and 2 are commonly used.
Figure 2B:
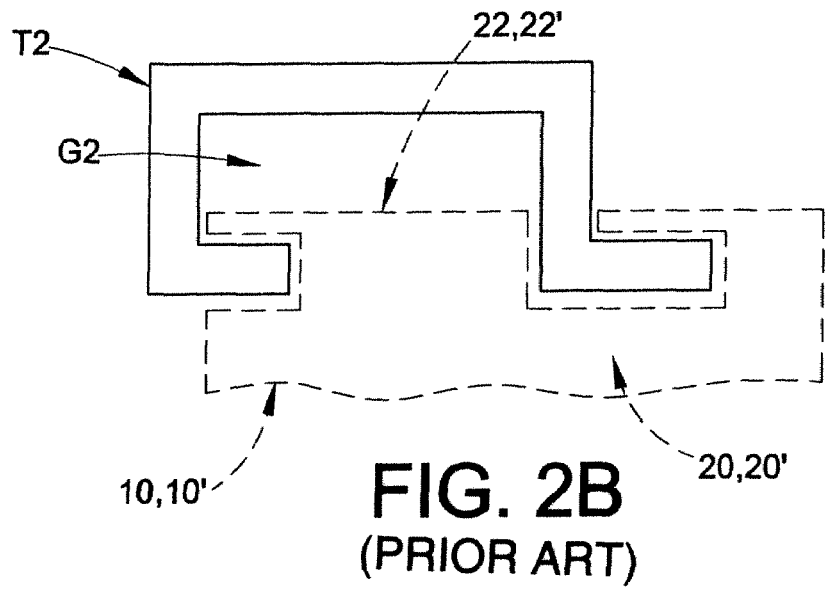
Figure 2C:
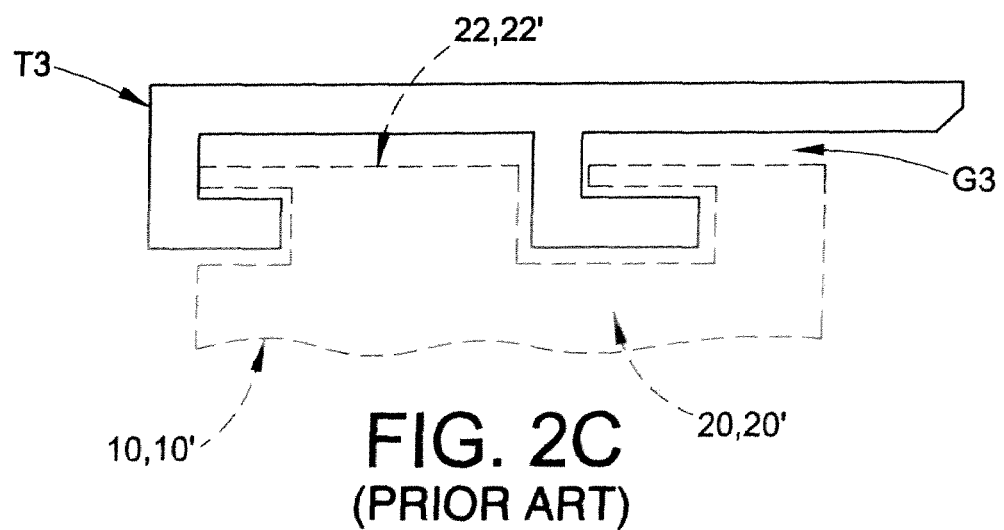
Figure 3A:
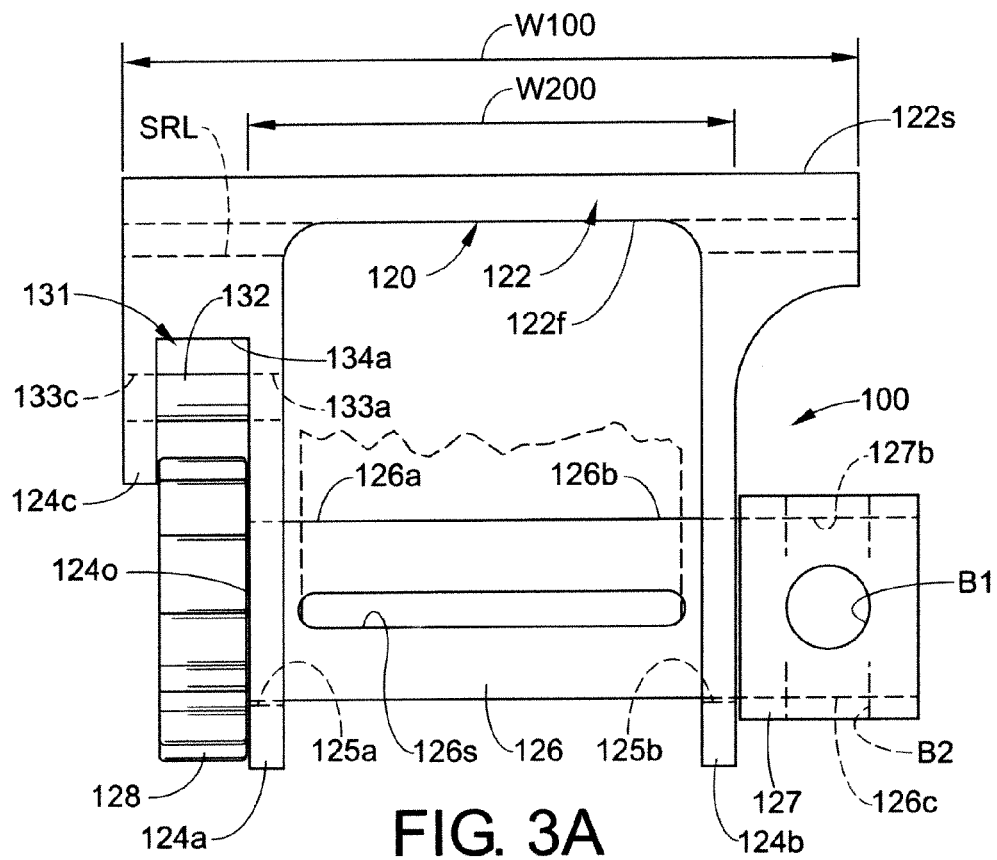
FIG. 3A is a front elevational view of a winch formed in accordance with the present development (the pawl is not shown to simplify the drawing)
Figures 3B, 3C:
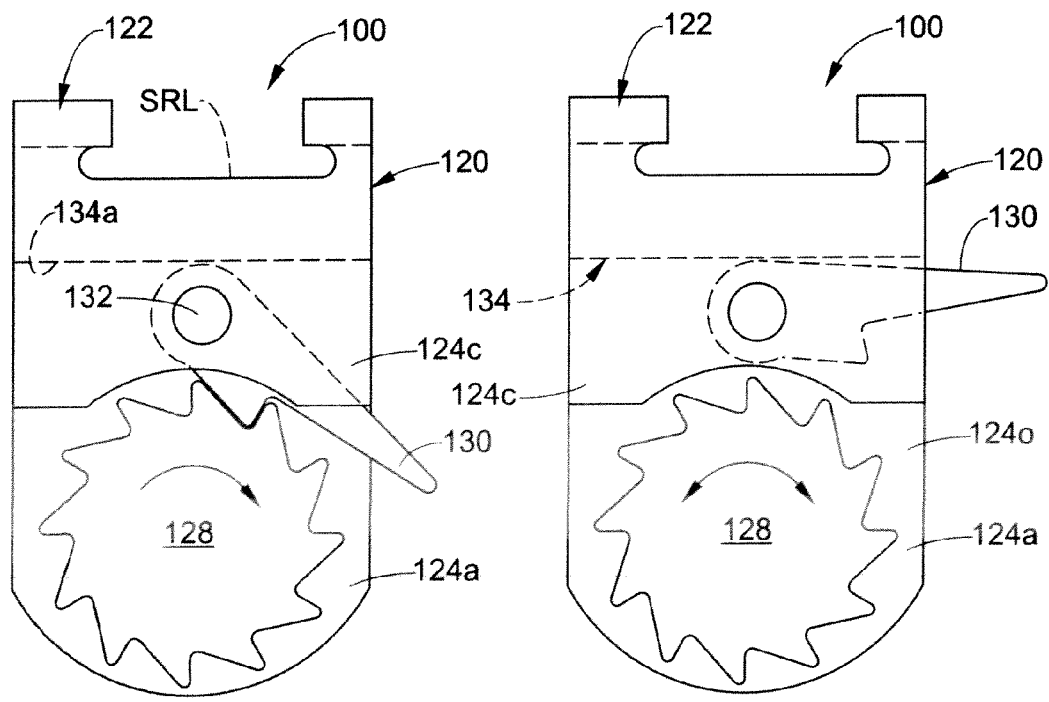
FIG. 3B is left side elevational view of the winch shown in FIG. 3A and showing the pawl.
FIG. 3C is similar to FIG. 3B, but shows the pawl disengaged from the ratchet wheel.

A winch for a cargo-retaining strap formed in accordance with the present development is shown generally at 100 in FIGS. 3A-3C. The winch comprises a one-piece extruded aluminum alloy frame 120 comprising a base 122 and first and second parallel spaced-apart legs or sidewalls 124a, 124b that project outwardly from a first side 122f the base. A suitable aluminum alloy (sometimes referred to herein simply as "aluminum") for defining the frame 120 is 6061-T6 but others can be used without departing from the present invention, e.g., 6063 aluminum alloy or aircraft-grade aluminum alloys such as 7005, each with suitable heat-treatment. The frame 120 could also be defined as a one-piece aluminum alloy casting if desired. The frame 120 is shown by itself in FIG. 3D.

The legs 124a,124b define respective aligned apertures 125a,125b, and first and second ends 126a,126b of a spool 126 are rotatably supported respectively in these apertures, and the spool extends between and through the legs 124a, 124b. In the illustrated example, the spool comprises a slot 126s defined therein, and a conventional cargo-retaining strap S (typically fitted with a flat or other style hook at its opposite distal end) is inserted in the slot 126a and is wound around the spool for use/storage.

As described above in relation to the conventional winches 10,10', the strap S is payed-out from the spool 126 as needed by counter-clockwise rotation of the spool 126, and retracted as needed by clockwise rotation of the spool 126. A ratchet wheel 128 is connected to the spool 126 (preferably but not necessarily as a one-piece construction) and rotates with the spool 126 adjacent an outer face 124o of sidewall 124a.

A pawl 130 (FIG. 3B) pivots between a first position (FIG. 3B), where it engages the ratchet wheel 128 and prevents counter-clockwise rotation of the ratchet wheel and spool 126 but allows clockwise rotation for strap tightening operations, and a second position (FIG. 3C), where it is disengaged from the ratchet wheel 128 to allow free rotation of the ratchet wheel and spool in either direction. The pawl 130 is normally positioned in its first position by force of gravity. The pawl 130 is preferably defined as a one-piece aluminum extrusion.

It is important to note that the one-piece aluminum alloy frame 120 defines a clevis structure 131 (FIG. 3A) comprising the sidewall 124a and an outer, protective wall 124c that cooperate to define a channel 134 therebetween. Aligned apertures 133a,133c are defined respectively in the walls 124a,124c. An inner end of the pawl 130 is located in the channel 134 with minimal clearance between the walls 124a,124c to prevent lateral movement of the pawl in the channel 134 between the walls 124a,124c while still allowing for the required operative pivoting movement of the pawl 130 between its first and second operative positions. The fastener 132, which can be a bolt, pin, rivet or the like is connected to and extends between the sidewall 124a and outer wall 124c, passing through their respective apertures 133a,133c. As shown, the fastener 132 comprises a straight pin that is friction-fit into the apertures 133a,133c. The fastener 132 is preferably defined from stainless-steel or other corrosion-resistant metal. It can be seen that the fastener engages the frame 120 at two locations on opposite sides of the pawl 130, i.e., the wall 124a and the wall 124c, for added strength and to evenly distribute loads from the ratchet wheel 128 throughout the frame 120. As shown in FIG. 3A, the ratchet wheel 128 is aligned with the channel 134 so as to be operably located to be engaged by the pawl 130. The ratchet wheel 128 and pawl 130 preferable have matched widths so as to prevent the ratchet wheel from exerting uneven loads on the pawl and fastener 132, and this width is significantly wider than the widths of the ratchet wheel and pawl of conventional steel winches, e.g., 1" widths for the ratchet wheel 128 and pawl 130 as opposed to ⅝" widths for the ratchet wheel and pawl of conventional winches. Those of ordinary skill in the art will recognize that the clevis structure 131 by which the pawl 130 is secured to the frame 120 by a fastener that engages the frame 120 in two locations on opposite sides of the pawl 130 is far superior to any known structure where the pawl is secured to only one location of the frame. It has been found that the pawl 30 of conventional prior-art winches 10,10' is susceptible to deflection under high loads which leads to misalignment with the associated ratchet wheel 28 which, in turn, leads to uneven loads and further deflection (or complete detachment) of the pawl 30 and/or damage to the teeth of the ratchet wheel, all resulting in failure of the winch 10,10'. The clevis structure 131 of the winch 100 ensures that the pawl 130 is unable to deflect out of alignment with the ratchet wheel 128 and, as such, the engagement between the pawl 130 and ratchet wheel 128 is optimized. The clevis structure 131 and channel 134 thereof also serve to house the pawl 130 and protect same and the pivoting interface with the fastener 132 from dirt, ice, salt and other contaminants.

The ratchet wheel 128 is larger in diameter as compared to the aperture 125a defined in frame sidewall 124a and, as such, cannot pass therethrough. The opposite end 126c of the spool 126 projects outwardly from the sidewall 124b through aperture 125b. This end 126c of the spool is captured to the frame 120 by suitable means that prevent its withdrawal through the aperture 125b. In the illustrated embodiment, an extruded aluminum collar 127 comprising a bore 127b is fitted to the end 126c of the spool 126 and located closely adjacent the sidewall 124b. The collar 127 is secured to the end 126c of spool 126 by welding or other means. The collar 127 is enlarged relative to the aperture 125b and is unable to pass therethrough. In this manner, the spool 126 is captured to the frame 120, and movement of the spool laterally between the sidewalls 124a,124b is minimized owing to the closeness between: (i) the ratchet wheel 128 and the outer face 124o of sidewall 124a; and, (ii) the collar 127 and the sidewall 124b.

The collar 127 defines a driving head by which the spool 126 is rotated. The collar 127 can define flats or other structures for being engaged by a tool. In the illustrated embodiment, however, first and second intersecting bores B1,B2 are defined through the collar 127 and underlying spool end 126c and are arranged transversely to each other, e.g., at 90°. A winch bar or similar tool (not shown) is inserted in one of the bores B1,B2 for purposes of rotating the spool 126.

The frame 120 is defined as a one-piece aluminum extrusion. As shown in FIG. 3A, the aluminum extrusion is advantageous in that it allows for placement of aluminum material in the desired regions while still keeping a one-piece structure, so that the base 122 defines a footprint or maximum width W100 that is much larger that the maximum width W200 defined inclusively between the sidewalls 124a,124b so as to more evenly distribute loads from the strap S to the aluminum structure to which the winch 100 is connected during use, e.g., an extruded aluminum double-L track or extruded aluminum side-rail of a flat-bed trailer. In the illustrated embodiment, the width W100 is about 50% larger than the width W200.

Figures 4A, 4B:
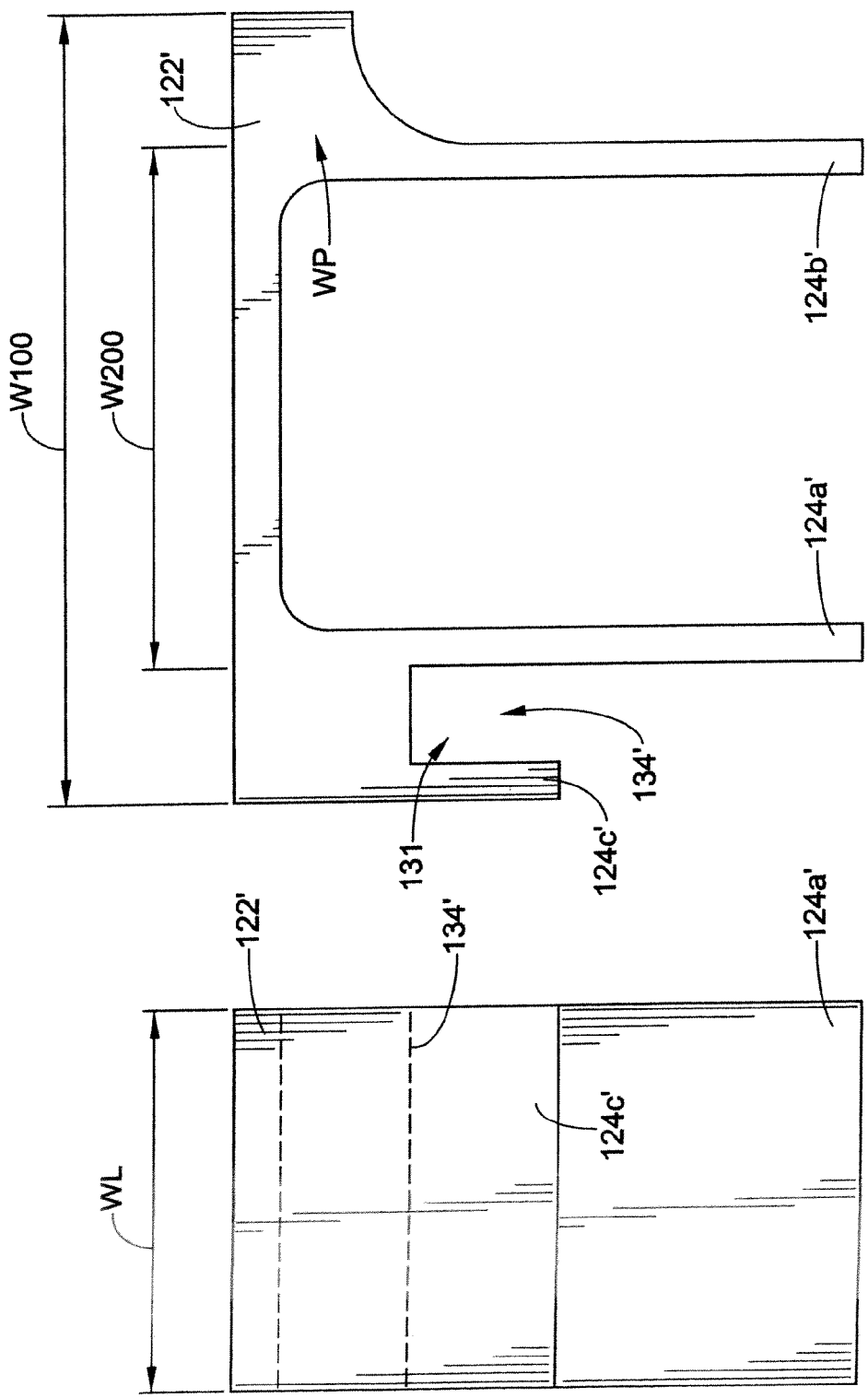
FIGS. 4A and 4B are front and left side elevational views of an extruded aluminum workpiece from which the frame of the winch of FIGS. 3A-3C is defined.
Figure 5:
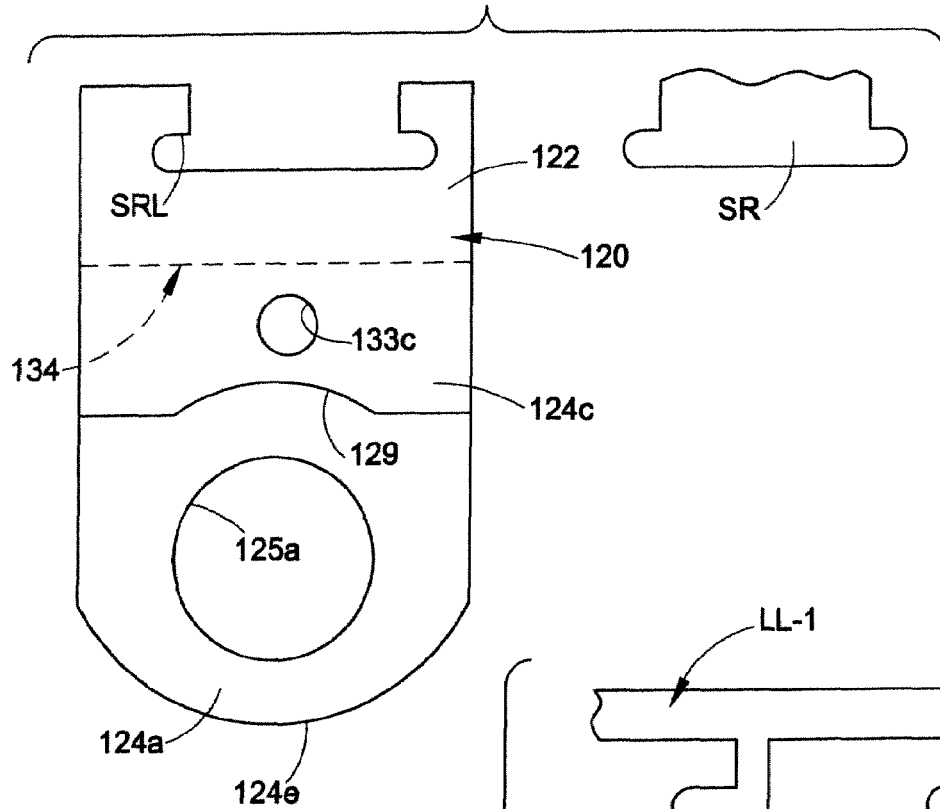
FIG. 5 shows the workpiece of FIGS. 4A and 4B machined to define a frame of the winch of FIG. 3A-3C and partially shows a flanged side-rail on which the winch is adapted to be slidably mounted.
Figure 6A:
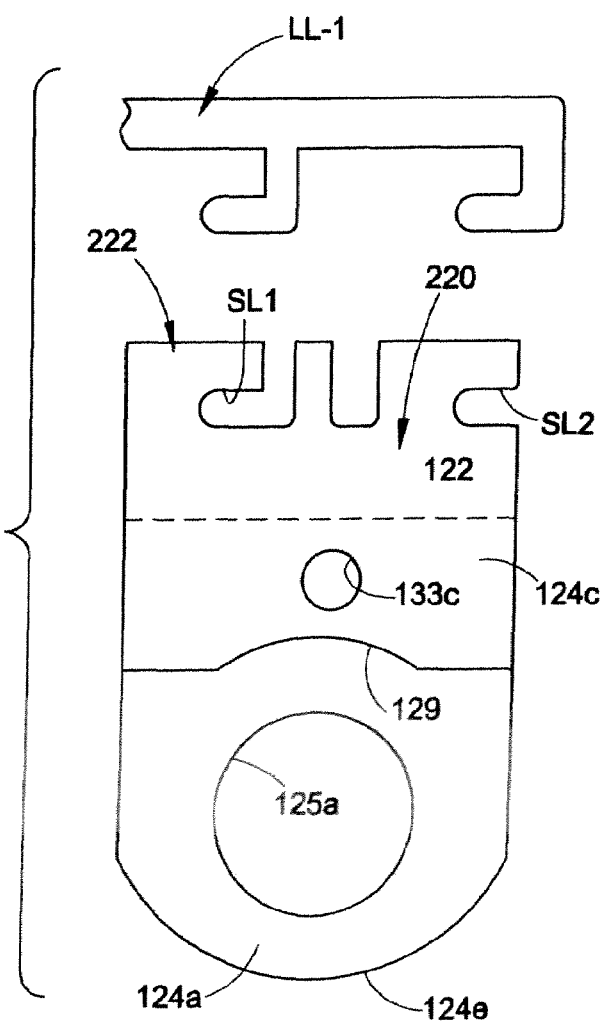
FIG. 6A shows the workpiece of FIGS. 4A and 4B machined to define an alternative frame that is identical to that shown in FIG. 5, but that is adapted to be slidably mounted on a double-L track which is partially shown.

FIGS. 4A and 4B illustrate a raw extruded aluminum workpiece WP from which the frame 120 is defined by machining and/or other conventional processing to remove undesired material. The workpiece WP is extruded with the profile as shown in FIG. 4A and cut to length WL as shown in FIG. 4B. The profile of the workpiece WP as shown in FIG. 4A corresponds to the profile of the finished frame 120 and, thus, comprises the above-described profile (with corresponding section labeled using a primed (') suffix) including a base portion 122', sidewall portions 124a',124b', an outer protective wall portion 124c', and channel 134'. The completed frame 120 is constructed by machining or otherwise processing the workpiece WP to have the shape as shown in FIGS. 5 or 6A or otherwise as desired. The aluminum alloy workpiece WP as shown in FIGS. 4A and 4B can also be cast if desired. The use of a cast or extruded workpiece allows for the aluminum alloy material to be placed exactly where needed for added strength and/or functionality, without requiring undesirable bending or welding operations.

Figure 3D:
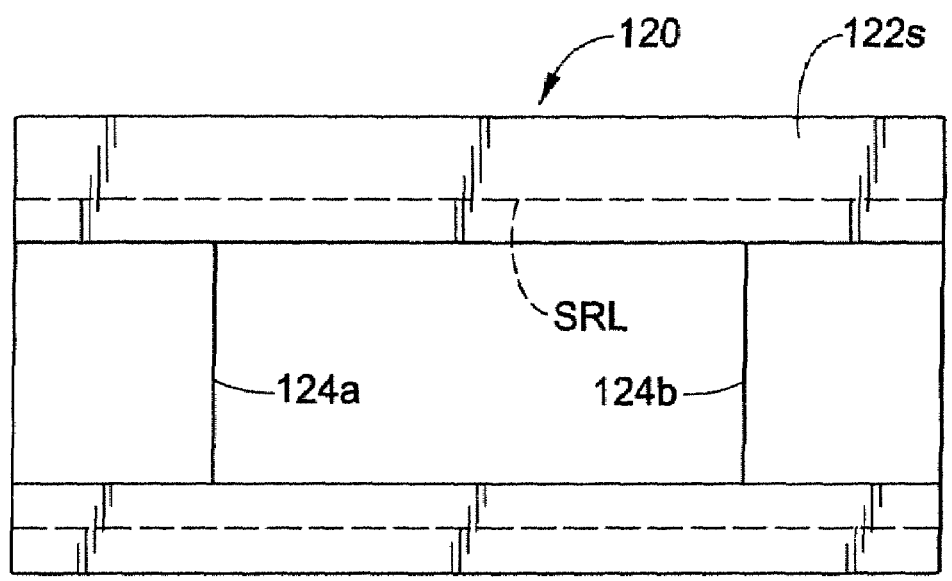
FIG. 3D is a view as taken along view line 3D-3D of FIG. 3A, showing the winch frame only for clarity.

FIGS. 3D and 5 illustrate a first embodiment of the frame 120, wherein the base portion 122' of the extruded workpiece WP has been machined to define the second side 122s of the base 122 of the frame 120 with a slot SRL adapted to slidably receive a winch mounting structure of a trailer such as an extruded aluminum flanged side-rail SR of a flat-bed trailer or other cargo bed with a perfect intimate fit without gaps between the rail SR and the base 122 of the frame 120 (of course the fit is such that the base 122 can slide on rail SR). The sidewall portions 124a',124b' of the workpiece have each been machined to define a rounded end 124e and also to define the apertures 125a,125b in which the spool 126 is rotatably supported. The workpiece WP has been further machined to define the apertures 133a,133c and the outer wall 124c has been machined to define a ratchet wheel recess 129 to provide clearance for the ratchet wheel 128 to move into abutment with outer face 124o of wall 124a when spool 126 is inserted into the aligned apertures 125a,125b during assembly.

Figure 6B:
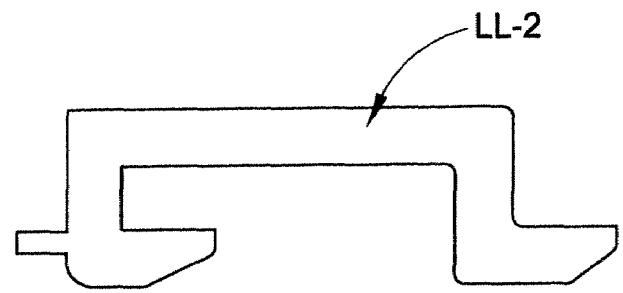
FIGS. 6B, 6C, and 6D (prior art) respectively illustrate alternative extruded double-L track profiles.
Figure 6C:
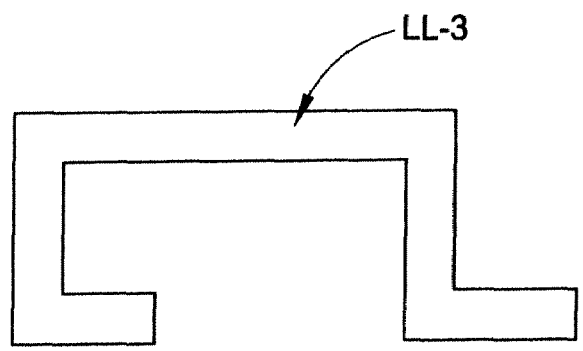
Figure 6D:
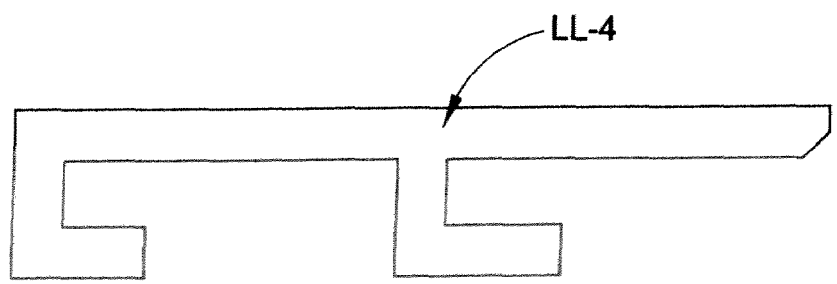

FIG. 6A illustrates a second embodiment of the frame 220, which is identical to the frame 120 except as otherwise shown and/or described. More particularly, the frame 220 is identical to the frame 120, except that the base portion 122' of the extruded workpiece WP has been machined to define the base 222 of frame 220 to include first and second slots SL1,SL2 adapted to mate slidably and intimately with a winch mounting structure comprising an extruded double-L track LL1 defined as a part of or connected to a cargo trailer or cargo bed. It can be seen that the slots SL1,SL2 of base 222 and track LL-1 are matched for a perfect sliding fit with minimal gaps between the base 222 and track LL-1 as could lead to uneven transfer of loads from the frame 220 to the track LL-1. FIGS. 6B, 6C, and 6D respectively illustrate alternative extruded double-L track profiles LL-2,LL-3, LL-4 and the workpiece base 122' can be machined with the required slots to perfectly slidably mate with these and other extruded track profiles (double-L, T-shaped, or other).

Figure 7A:
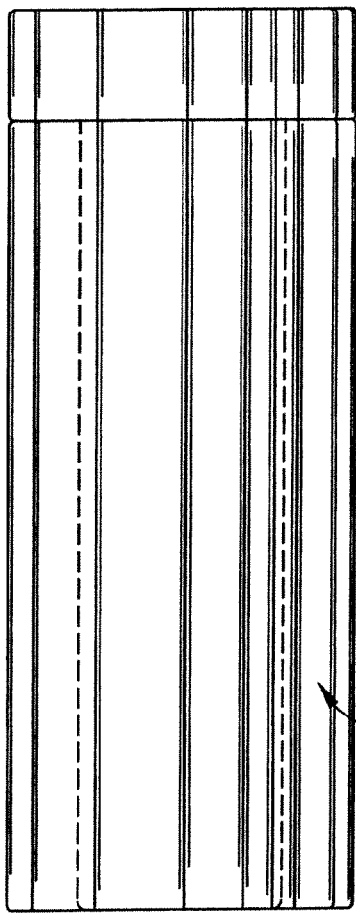
FIGS. 7A and 7B are front and side views of an extruded aluminum workpiece from which the one-piece spool and ratchet wheel of the winch of FIGS. 3A-3C is defined.
Figure 7C:
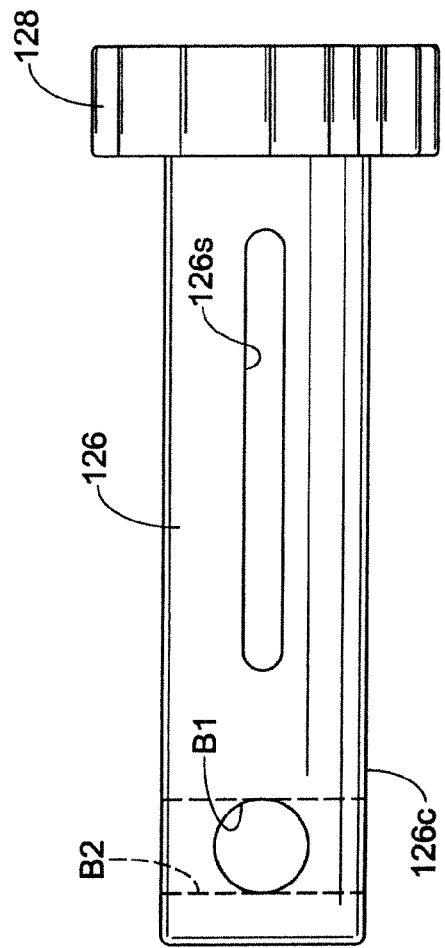
FIG. 7C shows the one-piece spool and ratchet wheel of the winch of FIGS. 3A-3C.
Figure 7B:
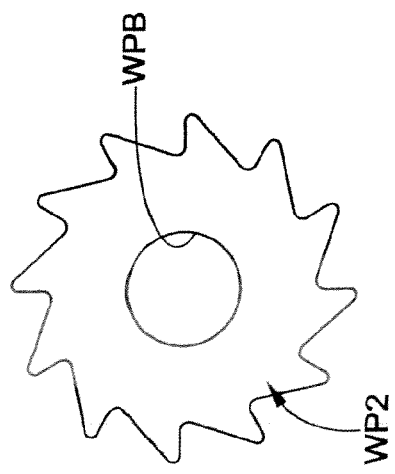

For added strength and in order to eliminate the need to weld or otherwise affix the ratchet wheel 128 to the spool 126, it is most preferred that the spool 126 and ratchet wheel 128 be defined as a one-piece construction. One example of this is shown in FIG. 7C, wherein the spool 126 and ratchet wheel 128 are defined as a one-piece aluminum extrusion. This is accomplished by extruding a workpiece WP2 having the profile of the ratchet wheel 128 along its entire length as shown in FIGS. 7A and 7B (note that the workpiece WP2 typically will be extruded with a central bore WPB that facilitates subsequent machining operations but need not be). The workpiece WP2 is then machined or otherwise processed to remove excess material along the broken lines of FIG. 7A so as to leave behind the one-piece spool and ratchet wheel structure shown in FIG. 7C. The slot 126a and/or bores B1,B2 for the winch bar are also defined if desired for a particular embodiment but are not absolutely required in all cases (bores B1,B2 are typically machined only after collar 127 is welded or otherwise affixed to the spool 126).

Figure 8:
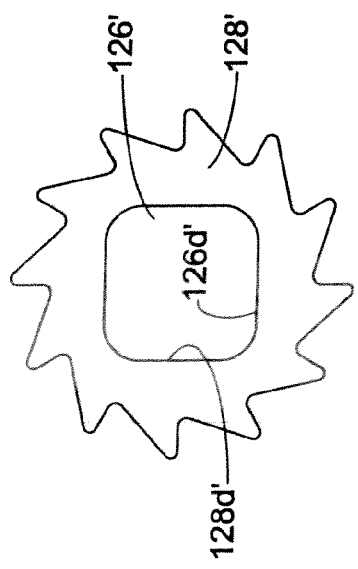
FIG. 8 illustrates a multi-piece spool and ratchet wheel assembly that can be used as an alternative to the one-piece spool and ratchet wheel of FIG. 7C.

The winch 100 can comprise a multi-piece spool and ratchet wheel assembly that can be used as an alternative to the one-piece spool and ratchet wheel of FIG. 7C. As shown in FIG. 8, an extruded aluminum ratchet wheel 128' is welded to a spool 126'. To increase resistance to separation of the ratchet wheel 128' from the spool 126' during use under severe torsional loads due to weld failure, it is preferred that the end 126d' of spool be defined with a non-circular cross-section (e.g., square, diamond, splined, hexagonal, etc.) and that the ratchet wheel 128' define a mating aperture 128d' that receives the mating end 126d' of the spool with a non-rotatable key-like fit. The spool 126' and ratchet wheel 128' are welded at this interface and, owing to the mechanical inter-fit as described, the shear forces exerted between the spool 126' and ratchet wheel 128' are transmitted between these components directly and not solely through the weld as would could lead to weld failure.

An aluminum alloy winch 100 as disclosed herein is deemed superior to conventional steel winches, such as the winches 10,10', for numerous reasons. The winch 100 is much lighter-weight as compared to conventional steel winches, even accounting for increased material usage. It is well known that common steels used for manufacture of conventional winches weigh about three-times more than common aluminum alloys per unit of volume. As such, even though the winch 100 has an increased footprint width W100 and other material additions as compared to conventional steel winches, a winch 100 will commonly weigh at least 30-40% less than a conventional steel winch. This weight advantage is multiplied by the number of winches (e.g., 16 winches) connected to the trailer or cargo bed. Furthermore, the winch 100 will not rust in the manner of a steel winch 10,10'. The winch 100 is made from an aluminum alloy that is identical to or similar to the alloys used to manufacture the trailer or cargo bed on which the winch will be deployed, and thus has the same or very similar hardness and elasticity properties which has been found to reduce damage to the structure of the trailer or other cargo bed to which the winch 100 is connected during use. The extruded (or cast) structure of the winch frame, as compared to a simple U-shaped steel plate structure, enables a one-piece construction of complex shape that has a footprint width W100 much greater than the width of the sidewalls 124a,124b so as to more evenly distribute loads from the strap S to the aluminum trailer or other structure to which the winch 100 is connected during use. Those of ordinary skill in the art will recognize that the clevis structure 131 by which the pawl 130 is secured to the frame 120 by a fastener that engages the frame 120 in two locations on opposite sides of the pawl 130 is far superior to any known structure where the pawl is secured to only one location of the frame.

Conventional steel winches are painted, and the paint coating quickly peels off under normal use. In contrast, the frame 120 and preferably all other components of the aluminum alloy winch 100 are anodized to provide an aesthetically pleasing, corrosion resistant outer surface. Anodizing is a well-known electrochemical process that thickens and toughens the naturally occurring protective aluminum oxide on the aluminum alloy parts. The resulting finish is extremely hard and is an integral part of the metal, but has a porous structure which can be colored if desired. Those of ordinary skill in the art will recognize that the ability to anodize the winch 100 rather than paint same provides another main advantage as compared to conventional steel winches.

Figure 9D:
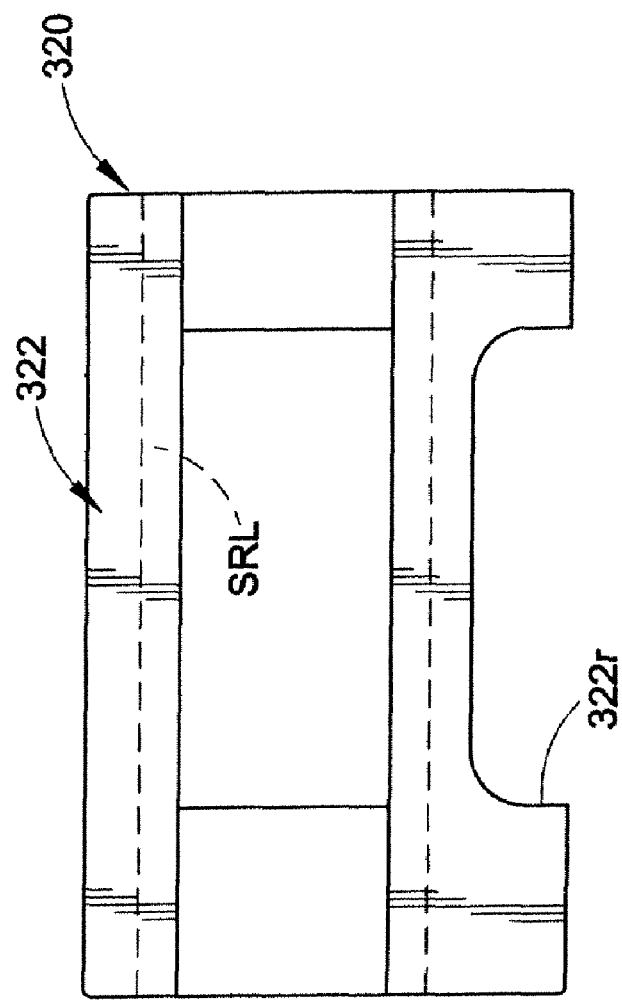
FIG. 9A is a front elevational view of a low-profile winch formed in accordance with the present development.
FIG. 9B is a left side elevational view of the winch of FIG. 9A as slidably engaged with an associated flanged side rail.
FIG. 9C is a front elevational view that is identical to FIG. 9A, without showing the pawl to aid in understanding the structure of the winch; and, FIG. 9D is a view as taken along view line 9D-9D of FIG. 9C, showing the winch frame only for clarity.

A low-profile winch for a cargo-retaining strap formed in accordance with the present development is shown generally at 300 in FIGS. 9A, 9B and 9C (FIG. 9C is identical to FIG. 9A except that the pawl and its fastener are not shown for clarity). The winch 300 is identical to the winch 100, except as otherwise shown and/or described herein. As such, like components relative to the winch 100 are identified with like reference numbers that are 100 greater than those used to identify features of the winch 100. A low-profile winch 300 is desirable for applications where a full height winch 100 will interfere with tires or other structures of a trailer or other cargo bed on which the winch is mounted.

The winch 300 comprises a one-piece extruded aluminum alloy frame 320 comprising a base 322 and first and second parallel spaced-apart legs or sidewalls 324a,324b that project outwardly from the base. The legs 324a,324b define respective aligned apertures 325a,325b (FIG. 9C), and a spool 326 is rotatably supported in these apertures and extends between and through the legs 324a,324b. In the illustrated example, the spool comprises a slot 326s defined therein, and a conventional cargo-retaining strap S is inserted in the slot 326s and is wound around the spool for use/storage. A toothed ratchet wheel 328 to be engaged by the pawl 330 is connected to the spool 326 to rotate therewith, either by welding or other means as described in relation to FIG. 8 or as a one-piece construction as described in relation to FIGS. 7A, 7B, 7C.

A pawl 330 (omitted from FIG. 9C for clarity) pivots between a first position (FIGS. 9A, 9B), where it engages the ratchet wheel 328 and prevents counter-clockwise rotation of the ratchet wheel and spool 326 but allows ratcheting clockwise rotation for strap tightening operations, and a second position (shown in broken lines in FIG. 9B), where it is disengaged from the ratchet wheel 328 to allow free rotation of the ratchet wheel and spool in either direction. The pawl 330 is normally positioned in its first position by force of gravity and/or manual movement by a user. The pawl 330 is preferably defined as a one-piece aluminum extrusion.

The one-piece aluminum alloy frame 320 defines a clevis structure 331 comprising the sidewall 324a and an outer, protective wall 324c that cooperate to define a channel 334 therebetween. Aligned apertures 333a,333c (FIG. 9C) are defined respectively in the walls 324a,324c. An inner end of the pawl 330 is located in the channel 334 with minimal clearance between the walls 324a,324c to minimize lateral movement of the pawl in the channel 334 between the walls 324a,324c while still allowing for the required operative pivoting movement of the pawl 330 between its first and second operative positions. The fastener 332, which can be a bolt (as shown), pin, rivet or the like is connected to and extends between the sidewall 324a and outer wall 324c, passing through their respective apertures 333a,333c. The fastener 332 is preferably defined from stainless-steel or other corrosion-resistant metal. It can be seen that the fastener 332 engages the frame 320 at two locations on opposite sides of the pawl 330, i.e., the wall 324a and the wall 324c, for added strength and to evenly distribute loads from the ratchet wheel 328 throughout the frame 320 as described above in relation to the winch 100. As shown in FIG. 9A, the ratchet wheel 328 is aligned with the channel 334 so as to be operably located to be engaged by the pawl. 330. The ratchet wheel 328 and pawl 330 preferable have closely matched widths so as to prevent the ratchet wheel from exerting uneven loads on the pawl 330 and/or fastener 332.

The winch 300 defines a height H (FIG. 9A) that is less than a corresponding height measurement of the winch 100 and, as such, is deemed a low-profile winch. By comparing FIG. 9B with FIG. 3B, those of ordinary skill in the art will recognize that this low-profile structure is accomplished by shortening the walls 324a,324b, shifting the spool 326 and ratchet wheel 328 inward toward the base 322 and by shifting the pawl 330 and fastener 332 forward/outward relative to a vertical plane V that extends through the rotational axis of the spool/ratchet wheel 326/328 so that the pivot axis P for the pawl 330 is far offset from the plane V. The pawl 330 and its pivot axis P are also shifted inward toward the base 322. This relocation of the pawl 330 is allowed by the fact that the base 322 defined a depth D that is greater than a corresponding measurement of the winch 100. Also, the channel 334 defined by the clevis structure 331 is machined to include a pawl recess 334p in which the pawl 330 is located. The recess 334p extends inwardly above the rail-receiving slot SRL (or slots SL1,SL2 or other mounting slot(s) defined in base 322) and, thus, allows part of the inner end of the pawl 330 also to be located inward relative to the rail-receiving slot SRL (or slots SL1,SL2 or other mounting slot(s) defined in base 322) as opposed to the winch 100, where the entire channel 134 and pawl 130 are located outward from the slot SRL (or slots SL1,SL2 or other mounting slot(s) defined in base 322). To allow maximum movement of the spool 326 and ratchet wheel 328 inward toward base 322 to provide a reduced height H, and unlike conventional winches, the entire pawl 330 and fastener 332 for same are shifted laterally away from vertical plane V so that, preferably, no part of pawl 330 and/or fastener 332 are located between the ratchet wheel 328 and the rail-receiving slot SRL (or slots SL1,SL2 or other mounting slot(s) defined in base 322). To prevent the cargo strap S from rubbing on the base 322 of frame 320, the frame preferably comprises a recess 322*r* (see FIG. 9D) defined in the base 322 between the first and second sidewalls 324*a*, 324*b*.

The invention has been described with reference to preferred embodiments. Modifications and alterations will occur to those of ordinary skill in the art to which the invention pertains upon reading this specification, and it is intended that the invention be construed as encompassing these modifications and alterations to the maximum possible extent.

The invention claimed is:

1. A winch for a cargo restraining strap, said winch comprising:
    a one-piece aluminum alloy frame including: (i) a base; (ii) first and second parallel spaced sidewalls extending from said base, said first and second sidewalls defining respective first and second apertures; (iii) a protective wall extending from said base and spaced from said first sidewall, wherein said first sidewall and said protective wall cooperate to define a clevis structure including a channel defined between said first sidewall and said protective wall;
    a pawl pivotably secured between said protective wall and said first sidewall of said frame, wherein an inner end of said pawl is located in said channel of said clevis structure between said protective wall and said first sidewall, said pawl manually movable between first and second positions;
    a spool extending between said first and second sidewalls and rotatably supported in the first and second apertures; and,
    a ratchet wheel connected to said spool and located adjacent said first sidewall, wherein said pawl engages said ratchet wheel and prevents movement of the ratchet wheel in one rotational direction when said pawl is pivoted to said first position, and wherein said pawl is disengaged from said ratchet wheel when said pawl is pivoted to said second position.

2. The winch as set forth in claim 1, wherein said base further comprises a slot defined therein and adapted to engage an associated trailer structure.

3. The winch as set forth in claim 1, wherein said one-piece aluminum alloy frame is defined by a one-piece extruded member.

4. The winch as set forth in claim 1, wherein said spool and said ratchet wheel are defined from aluminum alloy.

5. The winch as set forth in claim 4, wherein said spool and said ratchet wheel are defined together as a single one-piece construction.

6. The winch as set forth in claim 5, wherein said spool and ratchet wheel comprise an aluminum extrusion.

7. The winch as set forth in claim 1, wherein said first and second sidewalls define inclusively therebetween a width, and wherein said base defines a footprint width that is greater than said width defined inclusively between said first and second sidewalls.

8. A which for a cargo restraining strap, said winch comprising:
    a frame including: (i) a base; (ii) first and second parallel spaced sidewalls extending from said base, said first and second sidewalls defining respective first and second apertures; (iii) a protective wall extending from said base and spaced from said first sidewall, wherein said first sidewall and said protective wall cooperate to define a clevis structure including a channel defined between said first sidewall and said protective wall;
    a pawl movably secured to said frame, wherein an inner end of said pawl is located in said channel of said clevis structure, wherein said pawl is secured to said frame by a fastener that extends through said channel of said clevis structure and that is engaged with said protective wall and said first sidewall;
    a spool extending between said first and second sidewalls and rotatably supported in the first and second apertures; and,
    a ratchet wheel connected to said spool and located adjacent said first sidewall, wherein said ratchet wheel is selectively engaged by said pawl.

9. The winch as set forth in claim 8, wherein said fastener is defined from stainless steel.

* * * * *